United States Patent
Haisty

[11] 3,820,968
[45] June 28, 1974

[54] MAKING PATHS OF DEVITRIFIABLE CHALCOGENIDE GLASSES

[75] Inventor: Robert W. Haisty, Richardson, Tex.

[73] Assignee: Texas Instruments Incorporated, Dallas, Tex.

[22] Filed: July 21, 1971

[21] Appl. No.: 164,940

Related U.S. Application Data

[62] Division of Ser. No. 28,840, April 15, 1970, abandoned.

[52] U.S. Cl.............................. 65/33, 65/32, 65/60, 106/47 R
[51] Int. Cl....................... C03b 29/00, C03c 17/00
[58] Field of Search .......... 65/33, 32, 60; 106/47 R

[56] References Cited
UNITED STATES PATENTS

| | | | |
|---|---|---|---|
| 3,222,215 | 12/1965 | Durr | 65/60 X |
| 3,360,649 | 12/1967 | Brau et al. | 105/47 R |
| 3,393,060 | 7/1968 | Blair et al. | 65/33 X |
| 3,411,947 | 11/1968 | Block et al. | 65/33 X |
| 3,560,258 | 2/1971 | Brisbane | 65/60 UX |
| 3,580,709 | 5/1971 | Banks | 65/33 X |
| 3,615,317 | 10/1971 | Jagodzinski | 65/33 X |

OTHER PUBLICATIONS

Handbook of Glass Manufacture, Vol. II, Tooley – pages 192–199 – 1960.

Primary Examiner—Frank W. Miga
Attorney, Agent, or Firm—Harold Levine; James T. Comfort; James O. Dixon

[57] ABSTRACT

This application discloses a novel glassy material composed of germanium, antimony and selenium. This glass has the unique characteristic that it can be converted from a non-crystalline amorphous glass to a crystalline electrically conductive material by the application of heat.

3 Claims, 2 Drawing Figures

INVENTOR
ROBERT W. HAISTY

BY

ATTORNEY

MAKING PATHS OF DEVITRIFIABLE CHALCOGENIDE GLASSES

This Application is a division of Application Ser. No. 28,840, filed Apr. 15, 1970 now abandoned.

This invention relates to a novel glass composed of germanium, antimony and selenium. More particularly, this invention relates to a glass which can be changed from an electrically insulating material to an electrically conductive material by the application of heat.

The unique characteristics of this new glass suggest its use in applications where it is desirable to selectively form conductive regions within an insulating material. For example, the material could be used to form interconnect patterns on the surface of an integrated circuit.

In view of the above discussion, some objects of this invention are to provide a glass which can be easily devitrified to form an electrically conductive material.

A further object of the invention is to provide a method for forming electrically conductive lead patterns on a semiconductor substrate by selectively devitrifying a thin layer glass which has been formed on the surface of said semiconductor substrate.

These and other objects of this invention will be readily apparent from the following detailed description when read in conjunction with the claims and attached drawings.

Figure 1:
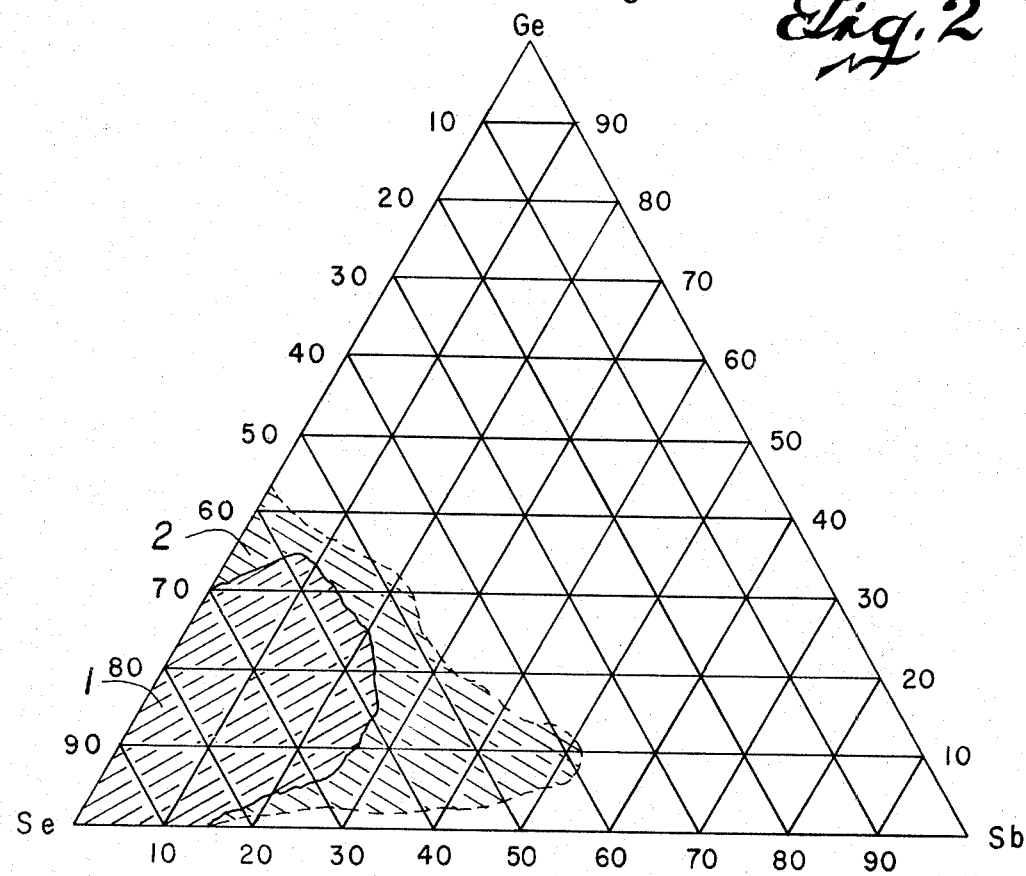
FIG. 1 shows a diagram defining the composition of the novel glass which is the subject of this invention.

FIG. 1 is the ternary chart showing all the possible combinations of a ternary system of selenium, germanium and antimony by atomic percentage of each constituent. The two shaded areas 1 and 2 show combinations which will form a glass when quenched to a suitable low temperature. The remainder of the combinations have been found to form crystalline material no matter what technique is used to melt and quench the material. The lighter shaded area 2 defines compositions which have been found to be convertible from nonconductive glassy material to highly conductive crystalline material by the application of heat. The temperature necessary to cause the conversion depends on the composition of the particular glass and ranges from 382°C to about 450°C. The conductivity of the regions which have been crystallized ranges from $10^{-2}$ ohm/cm to $10^{-1}$ ohm/cm. Prior to crystallization the conductivities respectively range from about $10^1$ to $10^4$ ohm/cm.

The specific composition within the ternary system from which glasses having the desired characteristics may be formed are as follows: germanium ranging from 40 to 2 atomic percent; antimony ranging from 50 to 0 atomic percent; selenium ranging from 38 to 78 atomic percent.

Starting materials for the glass consist of pelletized germanium, antimony and selenium. The desired amount of each material was carefully weighted, placed in a quartz tube which was sealed at one end, a vacuum pump was connected to the other end of the tube and used to reduce the pressure to less than 1 micron, and the container and the glass forming constituents were heated to 1,000°C to melt all the constituents, thereby forming a liquid pool in the bottom portion of the container. The container was then allowed to cool and the glass fused into a solid mass in the bottom of the tube. Following cooling, the tube was resealed a very short distance above the top of the fused glass. After resealing, the container was again placed in a furnace and heated to 1,000°C for one hour while it was being rotated and vibrated to assure a uniform mixture. The second melting cycle was followed by a quenching cycle in water at 20°C. The glass was then removed from the quartz tube enabling electrical measurements to be made on the resulting glass using conventional techniques.

Although the above procedure was used in preparing the glass used, it is believed that other techniques could be used. It is believed that the essential characteristics of any method which can be used to prepare the glass are:

a. an inert atmosphere to protect the glass from contamination during all phases of the process,
b. melting at 1,000°C or higher and agitating the constituents to assure a uniform mixture, and
c. rapid quenching of the molten glass to 20°C or lower.

As an alternate preparation method which is believed to be operable, although the operability has not been demonstrated, is a process wherein the glass forming constituents are melted in an argon atmosphere and quenched in liquid nitrogen. Additional suitable methods will be obvious to those skilled in the art.

Figure 2:
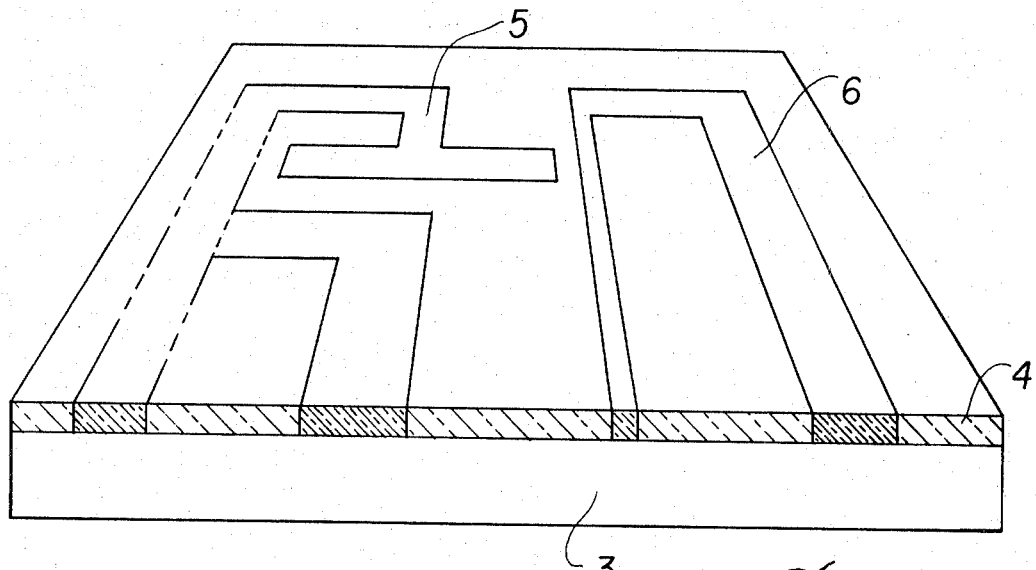
FIG. 2 shows a thin layer of the glass which is the subject of this invention, which can be deposited on a semiconductor substrate.

FIG. 2 shows a semiconductor substrate 3 covered by a thin layer of glass 4 of the type which is a subject of the invention, said glass adhering to the surface of the semiconductor with said glass layer having regions 5 and 6 which can be converted from a non-conducting glass to a conducting crystalline type material. This conversion can be accomplished by means of selectively heating regions 5 and 6 to a temperature of approximately 350°–400°C. Many techniques can be used to selectively heat the thin layer of glass 4; however, the most flexible technique is believed to be electron bombardment. The thin glass layer in FIG. 2 was formed by R–F sputtering in an argon atmosphere. This layer could be formed by any other technique which preserves the non-crystalline characteristic of the material.

Glasses of this family have also been found to be useful in many other applications. One specific example is for infrared lenses and is covered by U.S. Pat. No. 3,360,649, assigned to the same assignee as this patent. The particular application discussed is only one example of the many uses for this new and novel material. Additional uses and applications will be obvious to those skilled in the art.

What is claimed is:

1. An improved method of forming a plurality of electrically conductive interconnecting paths within an insulating coating on a substrate comprising:
   a. forming an amorphous glass material by melting together a mixture of germanium, selenium and antimony in the relative proportions encompassed by area 2 of FIG. 1 hereof and thereafter rapidly quenching said mixture,
   b. applying a layer of said mixture in its amorphous form to a surface of said substrate, and
   c. applying localized heating energy to the areas of the desired conductive paths in said coating to heat the path areas to a temperature above about 350°C.

2. The method of forming a plurality of electrically conductive interconnecting paths in accordance with claim 1, wherein said glass layer is applied by R-F sputter deposition.

3. The method of forming a plurality of electrically conductive interconnecting paths in accordance with claim 1, wherein said selective heating of said glass layer is produced by electron bombardment.

* * * * *